(12) United States Patent
Xiao et al.

(10) Patent No.: US 6,894,145 B2
(45) Date of Patent: May 17, 2005

(54) METHODS TO PURIFY POLYMERS (75) Inventors: Steven Shuyong Xiao, Laval (CA); Chunong Qiu, Brossard (CA); Cindy Xing Qiu, Brossard (CA)

(73) Assignee: Organic Vision Inc., Brossard (CA)

( * ) Notice: Subject to any disclaimer, the term of this patent is extended or adjusted under 35 U.S.C. 154(b) by 0 days.

(21) Appl. No.: 10/461,909

(22) Filed: Jun. 16, 2003

(65) Prior Publication Data

US 2004/0254336 A1 Dec. 16, 2004

(51) Int. Cl.$^7$ ............... C08J 3/00; C08J 3/02; C08J 3/09; C08J 3/11
(52) U.S. Cl. ............ 528/490; 528/496; 528/499; 528/487; 528/495; 525/338
(58) Field of Search ................ 528/490, 495, 528/496, 499, 487; 525/338

(56) References Cited

U.S. PATENT DOCUMENTS

| | | | |
|---|---|---|---|
| 3,531,448 A | * 9/1970 | Johnson ............ | 528/487 |
| 4,595,749 A | * 6/1986 | Hoxmeier ........... | 528/483 |
| 5,679,767 A | * 10/1997 | Suizu et al. ......... | 528/490 |
| 5,756,653 A | * 5/1998 | Rieke .............. | 528/378 |
| 5,777,070 A | * 7/1998 | Inbasekaran et al. ... | 528/394 |
| 6,177,521 B1 | * 1/2001 | Gibler et al. ........ | 525/338 |
| H001956 H | * 4/2001 | Schisla et al. ....... | 525/338 |
| 6,465,609 B2 | * 10/2002 | Ko et al. ........... | 528/490 |

OTHER PUBLICATIONS

Scherf, U et al, Advariced Materials, 2002, 14(7), p. 477.*
Chen, T. et al, Journal of American Chemical Society, 1995, 1 17, p. 233.*
Weinfurtner, K.H. et al, Applied Physics Lettqrs, 2000, 76(18), p. 2502.*
Friend, R.H. "Conductive Polymers from Science to Applications", University of☐☐Cambridge, 1993.*
Chiang, C.K. et al, Physical Review Lettefs, 1977, 39, p. 1098.*
Yamamoto, T. Synlett, 2003, No. 4, p. 425.*
Pei, Q.B. et gl. Journal of American Chemical Society. 1996, 118, p. 7416.*
Aldrich Catalog Handbook of Fine Chemicals, Aldrich Chemical Co, Inc, 1990, pp. 50, 571, 1089.*
Collins et al. Experiments in Polymer Schience, John Wiley & Sons, New York , 1973. p. 63.*

* cited by examiner

*Primary Examiner*—James J. Seidleck
*Assistant Examiner*—Irina S. Zemel (57) ABSTRACT

The present invention discloses methods to remove impurities in polymeric materials in order to improve the optoelectronic characteristics of devices fabricated from these polymers. The polymers include but not limited to polyarylenes, polyarylenevinylenes, polyaryleneethylnylene, polyfluorenes, polyanilines, polythiophenes, polypyrroles, and any conjugated co-polymers. The methods involve the selection of a scavenger or chelating agent and use it to remove metallic impurities from the polymers. The methods involve dissolving the polymer in a suitable solvent, adding a scavenger, mixing to form a scavenger, containing phase, and finally separating the scavenger containing phase from the polymer phase. According to this invention, it is preferable for the selected scavengers to have functional groups which can chemically react with metallic species and form a coordination compound that is not soluble in a selected solvent. The selected scavenger can be used in a free stand form or carried by either organic or inorganic media.

11 Claims, 5 Drawing Sheets

METHODS TO PURIFY POLYMERS

FIELD OF THE INVENTION

This patent discloses methods for the removal of impurities from conjugated polymers and co-polymers in order to improve opto-electronic performance of the devices fabricated using these polymers.

BACKGROUND OF THE INVENTION

Intrinsically conductive polymers possess conjugated π-electron systems along their backbone, giving them the ability to support positive and negative charge carriers with controllable mobility along the chains [see Friend, R. H., "*Conductive Polymers from Science to Applications*" University of Cambridge, 1993]. In addition to the metallic and semiconductor characteristics, they also exhibit unique electroluminescence properties. Thus, a variety of opto-electronic applications including electromagnetic shield, electronic wire, anti-corrosion layer, transistor, sensor, solar cell, memory storage and light emitting diode have been explored. Since the first discovery approximately 25 years ago [Chiang, C. K.; Fincher, C. R., Jr.; Park, Y. W; Heeger, A. J.; Shirakawa, H.; Louis, E. J.; Gau, S. C.; MacDiarmid, A. G., *Physical Review Letters*. 1977, 39, 1098], the conductive polymers have attracted strong interests in both industrial and academic areas. However, only rather limited commercial products have been developed so far. Among the various reasons for the limited commercial products and applications, purification of these polymers remains to be one major technical challenge.

Even a small amount of impurities present in the conductive polymers may act as charge trappers or photo quenchers, and alter their semiconductor characteristics. These impurities may be metallic and non-metallic, in neutral or ionic forms. For instance, in light emitting devices fabricated from conductive polymers, metallic impurities may act as recombination centers for injected charge carriers, leading to an increase in the recombination rates. The increased recombination rates often degrade the light emitting efficiency and increase the leakage current of the devices. If the metal content in a given electronic polymer system is not controllable, its semi-conductive behavior will not be predictable.

However, during the synthesis of the conjugated polymers, a relatively large amount of certain transition metallic-based materials is often used as catalysts [T. Yamamoto, *Synlett*, 2003, No.4, 425]. For the well-known conjugated polymeric system, polyfluorenes, the synthesis example was first given by Pei and Yang [Pei, Q. B., Yang, Y., *Journal of American Chemical Society*, 1996, 118, 7416]. In the Pei and Yang synthesis method, the polymerization of 2,7-dibromo-9,9-diakylfluorenes with $Ni^{II}$ salt/zinc was specifically described. Hence, it is anticipated that a certain quantity of Ni and other metallic species will remain in the final polymer products. In U.S. Pat. No. 5,777,070 entitled '*Process for preparing conjugated polymers*' issued on Jul. 7, 1998 to Inbasekaran, M., Wu, W. and Edmund, P. W., a synthesis method involving the Suzuki-type cross-coupling catalyzed by active palladium has been described. In this method, it is anticipated that certain amount of palladium and certain other metallic species will be present in the final polymers. More recently, Yamamoto-type coupling has been shown to lead to a higher molecular weight polymer for aryl-aryl coupling from dihaloaryls, in which more than two equivalent Ni(COD) (bis(1,5)cyclooctadiene) nickel(0)) are added as catalyst [Scherf, U., List, E. J. W., *Advanced Materials*, 2002, 14(7), 477]. In this last reported method, a certain amount of Ni is anticipated with other impurities in the final polymer products. From the above description, it is clear that metallic components are needed as catalysts in order to synthesize the conductive polymers, and the amount of these catalysts used varies from one reaction to the other. Moreover, the catalyst residue left inside the resulted polymer varies, depending on the reaction and the treatment procedures after synthesis. These metallic components may often remain in the conductive polymers after the synthesis and constitute impurities to affect the opto-electronic properties. Apart from these catalyst residues, there are other sources of additional metallic impurities. The other impurity sources may be from monomers that are used for organo-metallic polycondensations [T. Yamamoto, *Synlett*, 2003, No.4, 425] and other reactants used during the synthesis. They also include various contaminants or even walls of metallic reactors and agitators, containing various types of metallic impurities. Hence, depending on polymer synthesis procedures and post-synthesis treatment, various metals such as Ni, Zn, Fe, Ag, Pt, Pd, Cd, Mg, etc might exist in the final polymer products. These metals can exist in different forms, ionic or neutral, bonded or even un-bonded.

Therefore, the control of metallic impurities in any polymers for any opto-electronic device fabrication is required in order to achieve good characteristics. Due the factors to be described below, the control of metallic impurities in the polymers represents a highly technical challenge.

Reports on the methods for metallic impurity removal from polymers in the literatures are relatively limited. In a typical synthesis process, washing the polymer with water after the synthesis is the simplest way to remove impurities [Inbasekaran, M., Wu, W. and Edmund, P. W., U.S. Pat. No. 5,777,070]. This is because most polymers, conductive polymers in particular, are not water soluble whereas metallic ions in salt forms and not trapped in the polymers are usually water soluble. Therefore, some of the metallic ions not trapped in the polymers can be removed by washing with pure water. However, for those metallic impurities trapped in polymeric matrix it is difficult to wash them away as the polymers are not soluble in water. Washing with a selected solvent via a Soxhlet is another commonly used method and has been described by Chen, T., Wu, X., and Rieke, R. [*Journal of American Chemical Society*, 1995, 117, 233]. In this method, a solvent with a very low solubility of the polymer to be purified is chosen as the agent to wash the polymer. This low solubility is selected in order to keep the polymer in a solid form and to remove the impurities. However, this method is not effective enough in removing metallic impurities particularly those trapped inside polymeric matrix. In yet another method, repeated precipitation of a polymer solution from a high solubility solvent (for instance, polyfluorene in chloroform) with a low solubility solvent like methanol or acetone was adopted in an attempt to remove impurities [Weinfurtner, K-H., Fujikawa, H., Tokito, S., Taga, Y., *Applied Physics Letters*, 2000, 76(18), 2502]. However, in this method, it is not clear how many impurities could be removed, especially these metallic species are not soluble in either organic solvent used. In addition, this technique could consume big amount of solvent. It is noted that if the metallic species have limited solubility in the low solubility solvent, these metallic species will still precipitate along with the polymer.

SUMMARY OF THE INVENTION

One objective of this invention is to provide a chemical agent or a combination of chemical agents that are able to chemically react with metallic species. According to this invention, a chemical agent or a mixture of chemical agents are selected and added to a polymer solution containing the metallic species, and the metallic species are allowed to react with the selected chemical agents and the resulted metallic species containing compound are converted into a phase different from the polymer containing phase. The impurity species are then removed from the polymer by separating the two phases. Another objective of this invention is to provide a method which allows effective removal of metallic impurities from a polymer. In this method, the polymer is dissolved completely in one phase so that the metallic species trapped inside the polymers can be exposed. A high solubility solvent is used for this purpose and to dissolve the polymer. To this solution, a controlled amount of water containing chelating agent is added. After proper mixing, the solution mixture is allowed to set. Two distinguished layers are gradually formed due to the fact that the selected solvent used to dissolve polymer and water used to carry the chelating agent are insoluble each other and their specific densities are different. Thus, the polymer stays in the oil phase whereas the metallic species will be allowed to react with chelating agent and transfer to the aqueous phase. The oil phase is then separated from the aqueous phase in order to remove the impurity species from the polymer. This method is called liquid extraction method for the purification of polymers.

Yet another objective of this invention is to provide a method in which the metallic species are converted into a solid phase while the polymer remains in the oil phase. The solid phase is separated from the oil phase by filtration. This later method is called the solid extraction method for the purification of polymers.

DETAILED DESCRIPTION OF THE PREFERRED EMBODIMENTS

According to the liquid extraction method of this invention, metallic species are transferred into the aqueous phase and the polymers dissolved in a selected solvent to stay in the oil phase. Since the selected solvents are not miscible with water, thus the two phases can be separated due to differences in specific density.

Theoretically, the extraction process is determined by the distribution equilibrium of metallic species and the distribution of metallic species containing compounds formed by reaction with a selected chelating agent between the two phases. This equilibrium is again governed by the affinity of metallic species or metallic species containing compound to the two phases. There are many factors which can affect the affinity including but not limited to the nature of metallic species, the nature of chelating agent, the concentration of chelating agent, the nature of solvent, temperature, concentration, pH, etc. Hence, the efficiency of the removal of the metallic impurities from the polymers can be controlled by controlling the solvent type, chelating agent, temperature, concentration of the polymer in the solvent, the mass ratio of two phases, pH of each phase. Organic solvents suitable for use in the process of the invention shall be capable of dissolving the polymer, but shall not have strong interaction with metallic species and with the formed metal-containing compound. Preferably, the solvent is aprotic and posses low polarity, which does not interact with water. More preferably, the solvent is aromatic solvent like toluene or haloalkane like chloroform. Any substance which can react with metallic species to form a compound which is water soluble can be used as a chelating agent. The selected chelating agent preferably has functional groups including but not limiting to cyanide, amine, diamine, triamine, thiol, ethylenediaminobenzyl, triaminetetraacetate, thiourea, ethylenediaminetetraacetic acid, etc. The preferred upper limit of temperature at which extraction takes place is the boiling point of the immiscible liquid mixture consisting of a solution of polymer and water. The preferred concentration of polymer solution is 0.2 percent to 10 percent, more preferable 0.5 percent to 2 percent. Preferably, the mass ratio of water to solvent is 0.1 to 5. The pH of the liquid mixture can be controlled by adding appropriate base or acid. The added base or acid shall be soluble in water, the preferred base includes sodium hydroxide, ammonia, triethylamine, ethanolamine, etc and the preferred acid includes hydrochloric acid, acetic acid, etc. The preferred pH range is 3–11, more preferably, 4–9.

In addition, the mixing and stirring condition is critical. By a more thorough mixing of the two phases before setting for separation, the reaction between the metallic impurities and scavenger chemical agents can be enhanced and the efficiency of removal of the metallic impurities can be increased. The preferred mixing method including ultrasonic, mechanic shaking, magnetic stirring, or hand shaking up and down in a separation funnel. The longer mixing time, the higher the extraction efficiency. Preferably, the mixing time is not less than 1 hour.

After a thorough mixing, the system is allowed to set in order to get two distinctive phases separated. The polymer phase collected is concentrated thorough partial removal of solvent by vacuum distillation or by using a rotary evaporator. The polymer is then precipitated by addition of a poor solvent such as methanol, ethanol, hexane, acetone, depending on the nature of polymer. The precipitated polymer is now collected through filtration and may be further washed with a carefully selected solvent which has limited solubility to the polymer. This washing may help to remove some organic impurities and to reduce polymeric molecular weight dispersion. The washed polymer is finally dried in a vacuum oven to obtain the final purified polymer.

According to this invention in the solid extraction method, the polymer is soluble in a selected solvent to form a polymeric solution, a chemical agent which can chemically bond to the metallic impurities is added to this polymeric solution to result in a metal containing compound which is not soluble in the selected solvent. Hence, the resulted compound containing the metallic impurities can be then separated from the polymer solution by filtration. Filtration can be carried with conventional filtration funnels with either glass fiber or filter paper, preferably, with glass frit Buchner funnels. The pore size of the filter shall be selected depending on solvent type, particle size and filtration speed. The preferred porosity is 5 to 200 micrometer, and more preferable 10–100 micrometer. Vacuum suction can be applied to accelerate the filtration. Although filtration at room temperature is satisfied for most cases, filtration at a higher temperature of 25° C. to 80° C. may be preferred for high viscose solutions. In this solid extraction process, the added chemical agent is referred to as a scavenger. The scavenger can be in a free stand form or carried by either organic like inert polymeric resin or inorganic media like silica gel. Furthermore, the separation of the compound containing the metallic impurities from the polymer may be achieved by centrifugal force.

The affinity of scavenger to metallic species mainly determines the efficiency of such a purification process. There are many factors which can affect the affinity including but not limited to the nature of metallic species, the nature of scavenger, the nature of solvent, temperature, concentration, pH, etc. Hence, the efficiency of the removal of the metallic impurities from the polymers according to this invention can be controlled by controlling the solvent type, the selection of scavenger, the condition at which scavenger mixing with polymer solution including temperature, concentration of the polymer in the solvent, and so on. Organic solvents suitable for use in the process of the invention shall be capable of dissolving the polymer, but shall not have strong interaction with metallic species, scavenger, and the formed metal-containing compound. Preferably, the solvent is aprotic and has low polarity. More preferably, the solvent is aromatic solvent like toluene or haloalkane like chloroform. Heating of the polymer solution may be used to accelerate the reaction between the metallic species and the scavenger agent. The preferred upper limit of temperature at which extraction takes place is the boiling point of the solvent used. The preferred concentration of polymer solution is 0.2 percent to 10 percent, more preferably 0.5 percent to 2 percent. The amount of scavenger used depends on the metallic content in polymer and the reactivity with metals to be removed. Preferably, 5–50 molecular equivalent of scavenger reactivity to metal shall be applied.

In addition, the mixing and stirring of the polymer solution with scavenger is critical. By a more thorough mixing, the reaction between the metallic impurities and scavenger chemical agent can be enhanced the efficiency of removal of the metallic impurities can be increased. The preferred mixing method including ultrasonic, mechanic shaking, magnetic stirring, or hand shaking up and down in a separation funnel. The longer mixing time, the higher the extraction efficiency. Preferably, the mixing time is longer than 1 hour.

After a thorough mixing, the solid scavenger phase containing metallic compound is removed from the polymer liquid phase by filtration or by centrifugal force. The purified polymeric phase is then concentrated thorough a partial removal of solvent by vacuum distillation or by using a rotary evaporator. The concentrated polymeric solution is slowly poured into a poor solvent (with respect to polymer) and the purified polymer is thus precipitated. The precipitated polymer is now collected through filtration. The collected polymers may be further washed with a carefully selected solvent which has limited solubility to the polymer. This washing may help to remove some organic impurities and reduce polymeric molecular weight dispersion. The washed polymer is finally dried in a vacuum oven to have the final purified polymer.

It is noted that it is extremely critical to select carefully a chemical agent which can chemically bond to the metallic species to facilitate either the liquid extraction process or the solid extraction process. Depending on the nature of the chemical agent and how it reacts with metallic species, this chemical agent is referred to as a chelating agent, or a sequestering agent or a scavenger. The scavenger may be a chemical agent and a mixture of chemical agents. The main purpose of the scavenger is for the purification of metal-containing organic polymer. More importantly, the agent or mixture of agents must chemically react with metallic species in the metal-containing organic polymer to form a metal-containing compound so that the metal-containing compound can be separated from the organic polymer.

Therefore, it is another objective of this invention to provide suitable scavengers for the removal of impurities. Theoretically, any substance or chemical agent that can chemically react with the metal species to form a compound that is not soluble in a selected solvent can be used as a scavenger. In other words, it is preferable that the metal-containing compound forms a phase which is different from the phase of said organic polymer. In practice, the selected reagent shall (1) not to react with the polymer, (2) not to react with the selected solvent, (3) chemically react with metallic species to form a compound that can be easily separated from organic solvent and polymer.

In order to chemically react with a metallic species, the selected scavenger shall bear certain kind of functional groups including but not limited to cyanide, amine, diamine, triamine, thiol, ethylenediaminobenzyl, triaminetetraacetate, thiourea, ethylenediaminetetraacetic acid, etc.

Figure 1:
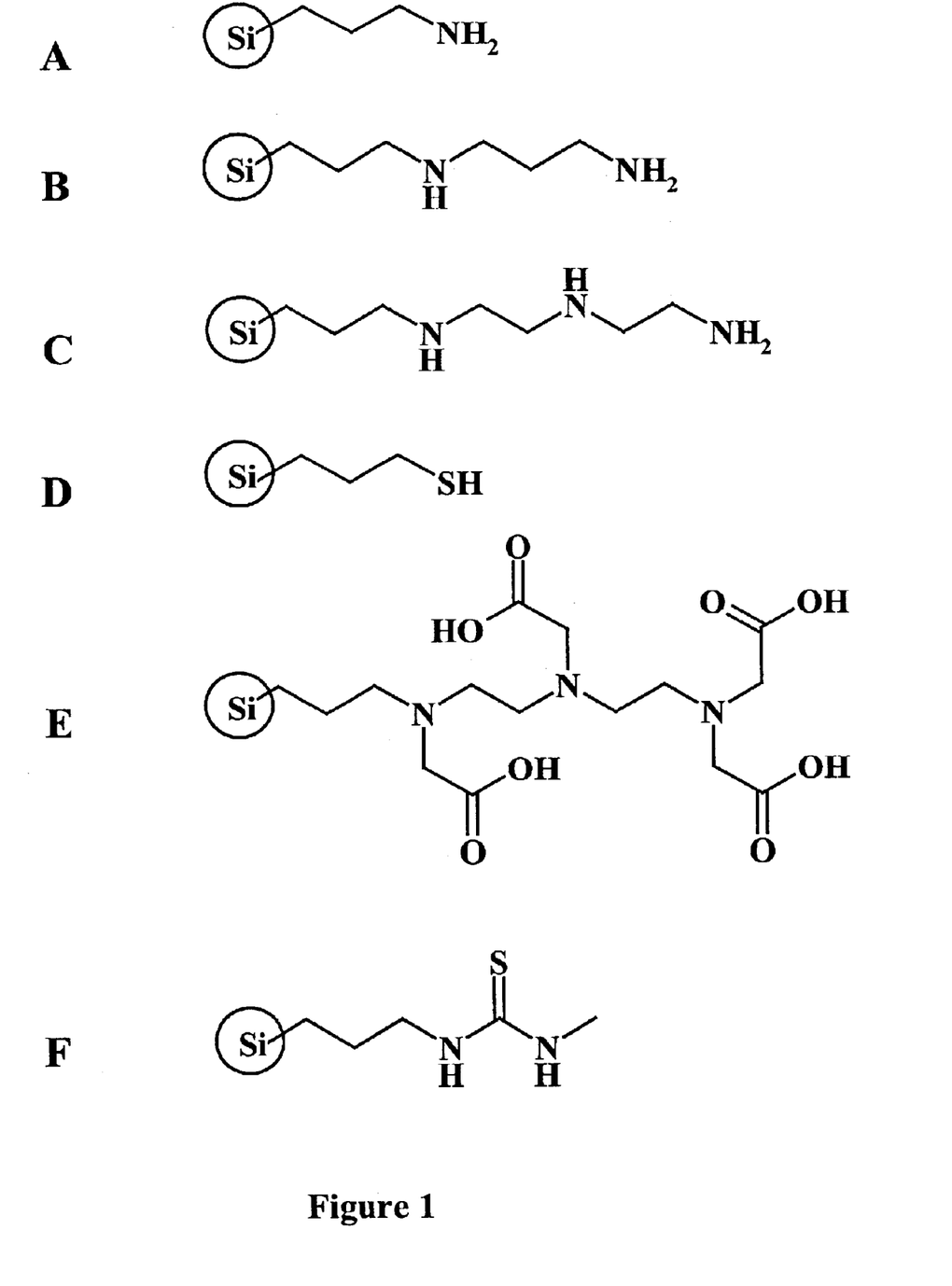
FIG. 1 Examples of silica supported scavenge agents: (A) silica-supported amine; (B) silica-supported diamine; (C) silica-supported triamine; (D) silica-supported thiol; (E) silica-supported triaminetetraacetate; (F) silica-supported thiourea.

A scavenger may be used in a free standing form (or free form) such as potassium cyanide (KCN), sodium cyanide (NaCN), ethylenediaminetetraacetic acid (EDTA) and others or carried by a supporter. The supporter can be organic materials (media) like polymers or inorganic materials (media) like silica. Furthermore, the supporter may well be a mixture of inorganic and organic media. In such an instance, there are usually two different functionality scavengers involved, one carried by an inorganic phase and the other carried by an organic phase. For example, a proton-exchange polymeric resin can be combined with a silica supported diamine. However, the polymeric resin must be carefully selected which should not dissolve in the selected solvent. FIG. 1 illustrates some examples of silica-supported scavengers. In FIG. 1, it is noted that six scavenger examples are shown: (A) silica-supported amine; (B) silica-supported diamine; (C) silica-supported triamine; (D) silica-supported thiol; (E) silica-supported triaminetetraacetate and (F) silica-supported thiourea.

It is thus clear that in this invention, simple and efficient methods to remove impurities in polymers, electro-opto-active polymers in particularly are disclosed. The impurities, metallic species in particularly can be simply and effectively removed from polymers by phase separation either in liquid extraction or solid extraction fashion. The disclosed methods involve the selection of a scavenger or chelating agent and procedures in order to use the selected scavenger to remove trace metals from a polymer, an electro-opto-active polymer in particularly.

According to yet another embodiment of this invention, the selected scavengers must have functional groups which can chemically react with the metallic species and form a coordination compound or compounds that is not soluble in a selected solvent. As an example, these functional groups can be cyanide, amine, diamine, triamine, thiol, ethylenediaminebenzyl, triaminetetraacetate, thiourea, ethylenediaminetetraacetic acid and others. According to still another embodiment of this invention, the selected scavengers may be used in a free form or carried by either organic or inorganic media. These media can be liquid like water or solid like polymer resin or silica. They can be used alone or in a combination.

The electro-opto-active polymers may be any kind of conjugated polymers that are soluble in a carefully selected solvent. Hence, according to an embodiment of this invention, these polymers include but not limited to classes of polyphenyl, polyphenylvinyl, polyfluorene, polyaniline, ploythiophene, polypyrrole, or any conjugated co-polymers. These polymers have potential applications in diode, light emitting diode, photovoltaic, sensor, transistor, and memory storage devices.

The procedure involve firstly dissolving the polymer in a solvent, secondarily adding scavenger in any form, thirdly mixing to promote the chemical reaction of scavenger with metallic species, and finally separating the scavenger containing phase from polymer phase.

The separation step can be carried out by extraction where the scavenger-containing phase is a liquid or by filtration where the scavenger-containing phase is a solid.

The purified polymeric phase is then concentrated thorough a partial removal of solvent by vacuum distillation or by using a rotary evaporator. The concentrated polymeric solution is slowly poured into a poor solvent (with respect to the polymer) and the purified polymer is thus precipitated. The precipitated polymer is now collected through filtration. The collected polymers can be further washed with a carefully selected solvent which has limited solubility to the polymer. This washing may help to remove some organic impurities and reduce the polymeric molecular weight dispersion. The washed polymer is usually dried in a vacuum oven to have the final purified polymer.

The trace metals to be removed from polymers are usually heavy metals, such as Ni, Pd, Pt, Zn, Ag, Hg, Pb, Fe, Co . . .

In the subsequent part of the patent, some examples on the purification of polymers according to this invention are given. It is clear that these examples are presented for illustration purposes and not presented to limit the scope of this invention.

EXAMPLE 1

Removal of Trace Metals from Polyfluorenes (PF)

Figure 2:
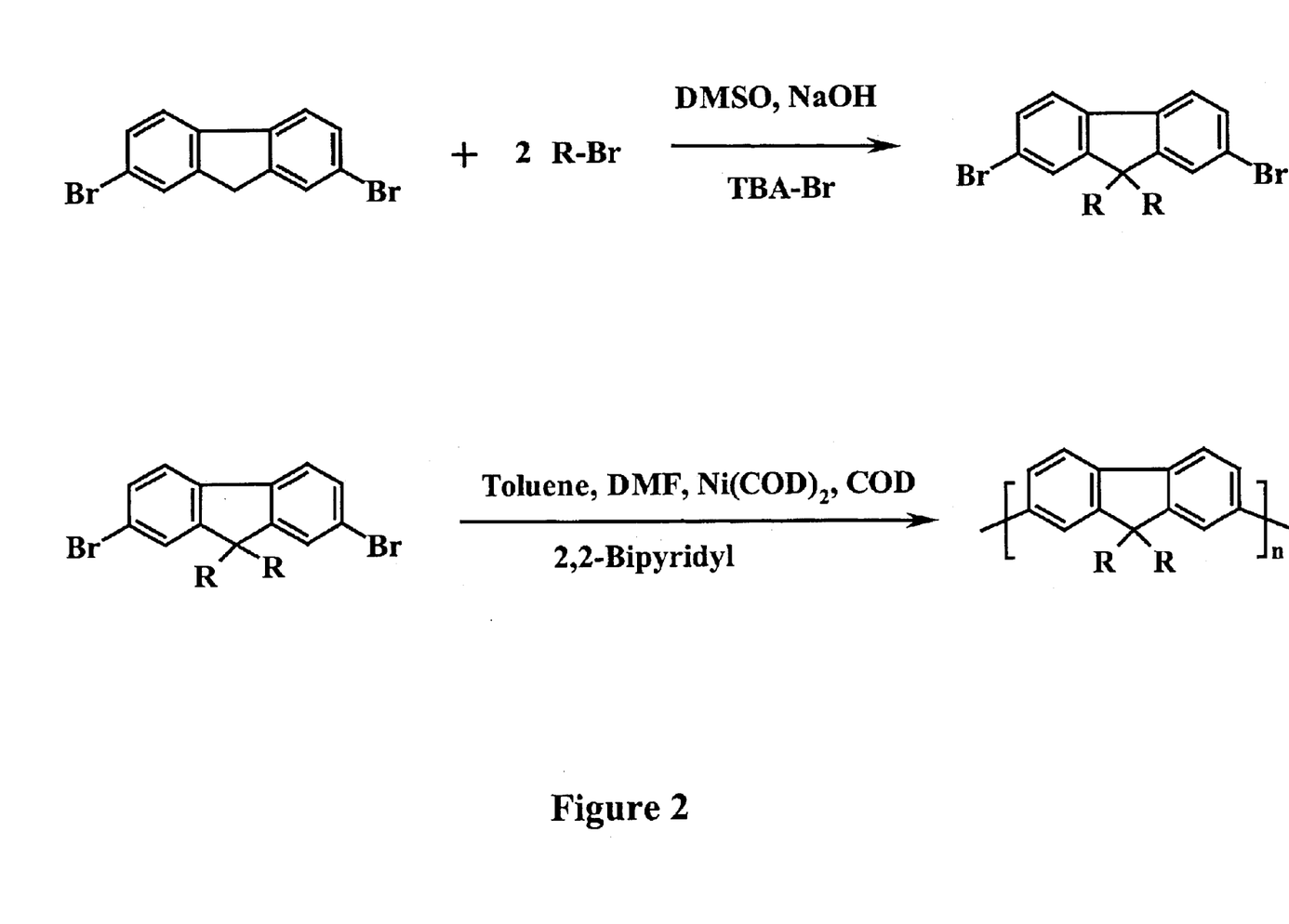
FIG. 2 A schematic illustration of the synthesis of polyfluorene via Yamamoto pathway.

Alkylsubstituted polyfluorenes have emerged as a very attractive class of semiconducting polymers, especially for display applications, owing to inherent pure blue and efficient electroluminescence emission coupled with a high charge-carrier mobility and good processability [U. Scherf and E. J. W. List, *Advanced Materials*, 2002, 14(7), 477]. Transition metal-catalyzed ary-aryl-coupling has paved the way for the synthesis of high molecular weight, structurally well-defined PF derivatives. FIG. 2 shows a general synthetic route to poly(9,9-diakylfluorene-2,7-diyl)s for Yamamoto-type reductive polycondensation of dihaloaryl compounds with Ni(COD)2 as an effective aryl-aryl coupling agent [T. Yamamoto; *Synlett*, 2003, No.4, 425]. Here it is noted that DMSO stands for dimethyl sulfoxide, TBA-Br is tetrabutylammonium bromide, DMF is N,N-Dimethylformamide, COD is bis(1,5-cyclooctadiene)nickel (0), and R is any alkyl group. For illustration purposes, a detailed preparation procedure is given below.

9,9-Dioctyl-2,7-dibromofluorene

In a 3-neck round-bottom flask (1,000 ml) equipped with a reflux condenser and an electronic thermometer, 2,7-dibromofluorene (64.8 g, 200 mmol, 1 eq.), 1-bromooctane (154.5 g, 800 mmol, 4 eq.), and tetrabutylammonium bromide (6.44 g, 20 mmol, 1/10 eq.) were dissolved in DMSO (dimethyl sulfoxide, 500 ml) under the protection of nitrogen. An aqueous solution of sodium hydroxide (32.0 g, 0.8 mol, 4 eq.) in water (40 ml) was dropped into the resulting light yellow solution with the speed of dropping controlled not to pass 60° C. The resulting brownish red reaction mixture was heated and stirred at 60° C. overnight. After it was allowed to cool down to room temperature, water (500 ml) was poured and the resulting mixture was stirred briefly and totally transferred into a separatory funnel (2,000 ml). The aqueous layer was separated and extracted with hexane (3×200 ml). The hexane extracts were combined, washed with 1 M hydrochloric acid (2×50 ml) and then with water (4×100 ml), and dried over $MgSO_4$ (magnesium sulfate) overnight. The drying agent was filtered away and the filtrate was removed on a rotary evaporator. The reddish yellow residue was slowly poured into well-stirred methanol (1,000 ml) in an Erlenmeyer flask (2,000 ml). The resulting yellow precipitates were filtered out, crashed, washed with methanol (3×100 ml), and dried under suction and then in a vacuum oven at 40° C. and 3 in./Hg overnight. A white crystal (98.0 g) was collected with the yield of 89.3% with a melting point 63–65° C.

Poly (9,9-dioctyl-fluorene-2,7-diyl)

A dried 3-neck round-bottom flask (500 ml) was flashed with nitrogen for 30 minutes. In this flask, anhydrous DMF (N,N-Dimethylformamide,75 ml), 2,2'-dipyridyl (5.0 g), cyclooctadiene (7.5 g) and bis(1,5-cyclooctadiene)nickel(0) (10 g ) were quickly added. The mixture was heated to 80° C. for 20 minutes, and a shine purple solution was observed. To this purple solution, deoxygenated toluene (100 ml) containing 9,9-dioctyl-2,7-dibromoflurene (10 g) was added quickly. The mixture was stirred for 72 hours at 80° C. to promote the polymerization. After cooling to room temperature, the reaction mixture was poured into a pre-prepared solvent mixture containing hydrochloric acid (36%, 1000 ml), acetone (1000 ml), and methanol (1000 ml) under stirring and kept stirring for another 24 hours in order to partially transfer nickel into a soluble form while to get polymer precipitated. The resulted precipitate was filtered out and washed with methanol and dried. Reprecipitation of polymer was carried out from tetrahydrofuran solution upon addition of methanol. Standard purification of polymer by Soxhlet extraction with methanol for 24 h and with acetone for another 24 h afforded 4.8 g of the dried polymer.

FTIR and NMR spectra confirmed the structure of the resulted polymer to be poly(9,9-dioctylfluorene-2,7-diyl). Gel permeation chromatography(GPC) reviewed the molecular weight of this polymers against the polystyrene standards to be about 110,000 (Mw) by weight or 50,000 (Mn) by number, respectively. The nickel content was determined by atomic absorption and found to be 350 ppm at this stage. This is the polymer before purification with any methods described in this invention. In deed, this is the product that can be usually delivered according to any standard procedures disclosed in any literatures including patents. This polymer is referred to as PFO-P0. However, the stability and performance of devices fabricated using this polymer containing the metallic impurities are not satisfactory.

Removal of Nickel From PFO-P0.

Method A1: Liquid extraction with ethylenediaminetetraacetic acid (EDTA). In a 2000 ml flask, 1.0 g of polymer PFO-P0 was dissolved in 200 ml of toluene. To this solution was added 100 ml of 5% EDTA aqueous solution (pH was pre-adjusted to 8–10 with ammonia) and the resulting mixture was vigorously stirred for 4 h at 40° C. before transferring to a 2000 ml separation funnel to settle. After two layers separated, the toluene layer was collected in a 1000 ml evaporation flask and then concentrated to about 50 ml. The concentrated toluene solution was then slowly poured into a flask containing 1000 ml of methanol under stirring. The resulting light yellow precipitate was filtered, washed with methanol and finally dried under vacuum, which gave 0.7 g of fiber-like polymer. We referred this polymer as PFO-PA.

Method B1: Solid extraction with free potassium cyanide. In a 1000 ml flask, 1.0 g of polymer PFO-P0 was dissolved in 500 ml of toluene. To this solution were added 5 g of potassium cyanide in granular form, 5 g of alumna with particle size 50–100 micro. The resulting mixture was vigorously stirred for 24 h at 50° C. before solid removal by filtration. The filtrate was collected in a 1000 ml-evaporation flask and then concentrated to about 50 ml. The concentrated toluene solution was then slowed poured into a flask containing 1000 ml of methanol under stirring. The resulted light yellow precipitate was filtered, washed with methanol and finally dried under vacuum, to give 0.8 g of fiber-like polymer. We referred this polymer as PFO-PB.

Method C1: Solid extraction with silica supported scavengers. In a 1000 ml flask, 1.0 g of polymer PFO-P0 was dissolved in 500 ml of toluene. To this solution was added 0.2 g of silica supported diamine (structure illustrated in FIG. 1) and 0.2 g of silica supported triaminetetraactate (structure illustrated in FIG. 1). The resulting mixture was vigorously stirred for 24 h at 50° C. before solid removal by filtration. The filtrate was collected in a 1000 ml-evaporation flask and then concentrated to about 50 ml. The concentrated toluene solution was then slowed poured into a flask containing 1000 ml of methanol under stirring. The resulting light yellow precipitate was filtered, washed with methanol and finally dried under vacuum, which gave 0.8 g of fiber-like polymer. This polymer is labeled as FO-PC.

Table 1 lists nickel contents of these polymers. It is seen that the concentration of nickel has been reduced to below 10 ppm from 350 ppm with the invented purification methods.

TABLE 1

Nickel content in PF polymer before ands after purification

| Polymer | PFO-P0 | PFO-PA | PFO-PB | PFO-PC |
|---|---|---|---|---|
| Ni (ppm) | 350 | 5 | 7 | 7 |

EXAMPLE 2

Removal of Trace Metals from Polythiophenes

Figure 3:
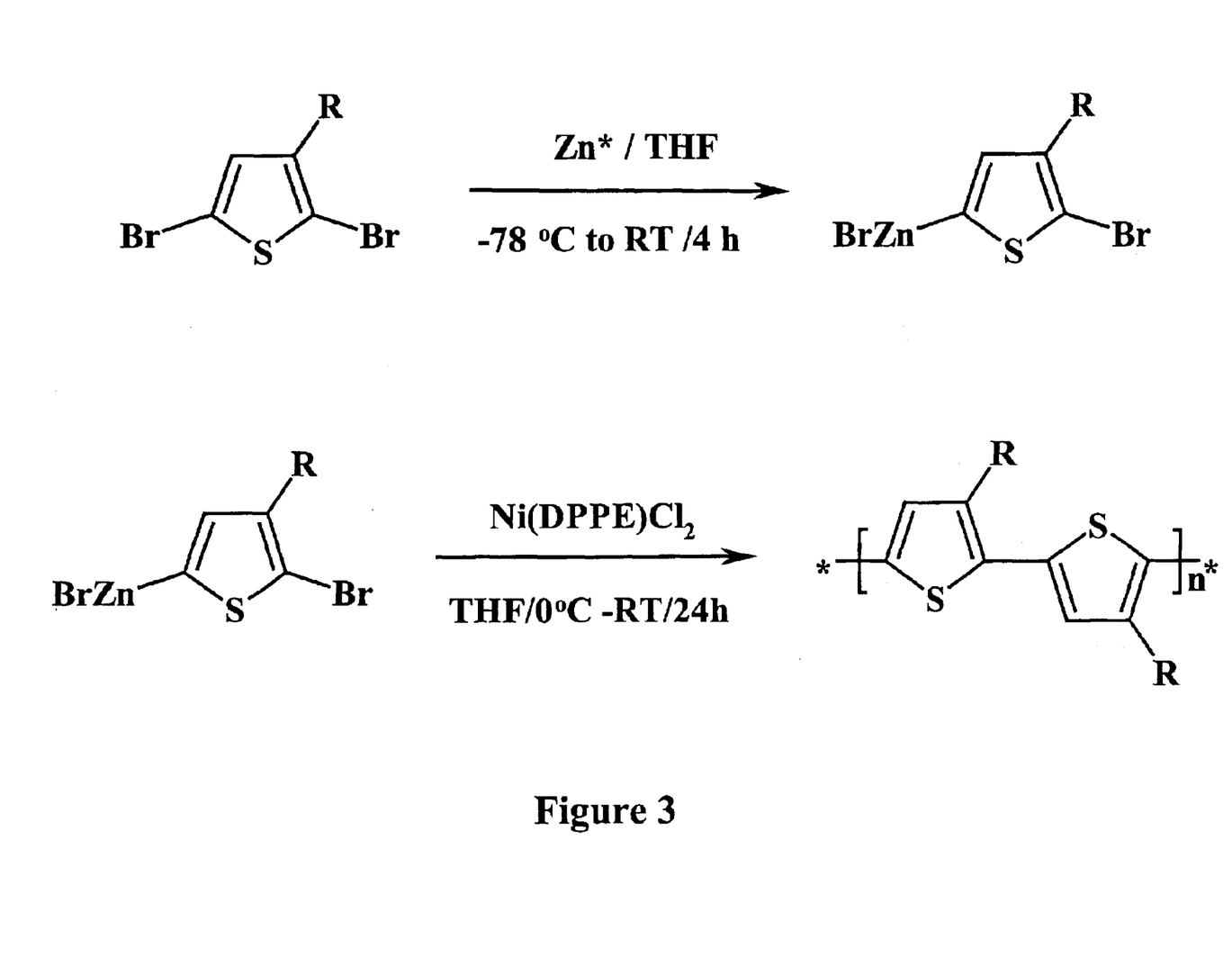
FIG. 3 A schematic illustration of the synthesis of polythiophene mediated by Rieke zinc.

Owing to their good solubility, processability, environmental stability, electroactivity, polythiophenes, poly(3-alkythiopnenes) in particular, are another class of conjugated polymers which exhibit a variety of potential applications including rechargeable battery electrodes, electrochromic devices, chemical and optical sensors, light-emitting diodes, microelechemical amplifiers and field effect transistors. Three chemical synthetic methods for polythiophenes have been developed. These are oxidative polymerization of 3-alkylthiophene by ferric chloride ($FeCl_3$), catalyzed dehalogenation of 2,5-dihalo-3-alkylthiophene by nickel (Ni) and regiocontrolled synthesis mediated by Rieke Zinc (Zn) as shown schematically in FIG. 3. Here, THF is tetrahrofuran, RT is room temperature, R is any alkyl group, and $Ni(DPPE)Cl_2$ is 1,2-bis(diphenylphosphion) ethane] nickel(II) chloride. All these polymerization methods involved transition metals. In the following example, we have synthesized poly(3-octylthiophene-2,5-diyl) mediated by Rieke Zinc following a procedure similar to that disclosed in U.S. Pat. No. 5,756,653.

Preparation of Rieke Zinc(Zn*). A dried 3-neck 250 ml flask was flushed through with nitrogen, lithium (0.3 g, 44 mmol), naphthalene (0.56 g, 4.4 mmol) and THF (30 ml) were added to this flask under nitrogen atmosphere. In a dried 100 ml dropping funnel, zinc chloride ($ZnCl_2$, 3.0 g, 22 mmol) and THF (50 ml) were added under nitrogen atmosphere and then dropped slowly into the above flask in a period of 2 hours. The reaction mixture was further stirred until the lithium disappeared. The resulting black suspension of active zinc thus prepared was referred as Rieke Zinc (Zn*) that was ready for using as a polymerization catalyst in the subsequent step.

Preparation of poly(3-octylthiophene-2,5-diyl). While cooling the above flask containing freshly prepared Rieke Zinc catalyst to −78° C. with liquid nitrogen, in another dried 100 ml dropping funnel, 2,5-dibromo-3-octylthiophene (7.1 g, 20 mmol) was dissolved in THF (40 ml) and flashed with nitrogen, and then added into the above flask at −78° C. The mixture was stirred for 1 hour at this temperature and allowed to warm up to 0° C. naturally in about 4 hours. At 0° C., 0.2% mol of [1,2-bis(diphenylphosphion) ethane] nickel(II) chloride ($Ni(DPPE)Cl_2$) (22 mg, 0.04 mmol, in 40 ml of THF) was added. The mixture was stirred for 24 hours at room temperature. A dark-purple precipitate was formed gradually in this period. The mixture was poured into a solution of methanol (200 ml) and hydrochloric acid (36%, 20 ml); the resulting precipitate was filtered and washed with methanol and then dried. Reprecipitation of polymer was carried out from chloroform solution upon addition of methanol. Standard purification of polymer by Soxhlet extraction with methanol for 24 h and then with hexane for 24 h afforded 3.1 g of the dried polymer. NMR confirmed the obtained polymer to be poly(3-octylthiophene) with a head-to-tail regioregular of over 98.5%. GPC results gave a molecular weight of Mw=42,000 and Mn=24,000. The thus obtained polymer was referred as PTO-P0.

Removal of metals from PTO-P0.

Method A2: A purification process similar to that described in Method A1 was carried out by replacing toluene with chloroform as the organic solvent. The purified sample was referred to as PTO-PA.

Method B2: The purification procedure similar to that described in Method B1 was performed by using chloroform to replace toluene as the organic solvent. The purified sample was named PTO-PB.

Method C2: Method C2 was similar to Method C1 except that chloroform was used as the organic solvent and an extra 0.2 g of silica supported amine (the structure is illustrated in FIG. 1) used as scavenging agent also along with 0.2 g of silica supported diamine and 0.2 g of silica supported triaminetetracactate. The purified sample was called PTO-PC.

Method A2C2: The sample obtained from Method A2, PTO-PA was further purified by Method C2 gave sample PTO-PAC.

Table—2 lists the metallic contents determined by an atomic absorption method. It proves that both zinc and nickel can be effectively reduced by the above methods. It is noted that a combination of these methods can remove trace metals further from the polymer matrix to yield high purity polymers.

TABLE 2

Metal contents in poly(3-octylthiophene) samples.

| Polymer sample | Zn (ppm) | Ni (ppm) | Pd (ppm) |
|---|---|---|---|
| PTO-P0 | 2956 | 113.6 | <3 |
| PTO-PA | 53.2 | 6.38 | <3 |
| PTO-PB | 35.4 | 23.0 | <3 |
| PTO-PC | 21.3 | 18.7 | <3 |
| PTO-PAC | 12.2 | <3 | <3 |

EXAMPLE 3

Polymer Light Emitting Diode (PLED)

To determine the effect of removal of impurities from polymers according to this invention, light emitting diodes were fabricated using the polyfluorenes before purification and after purification as demonstrated in example 1 and the characteristics are compared. A standard device configuration, ITO/PEDOT/Polymer/Ba/Al, was adopted. Device fabrication and testing were carried out in a dry-box with a controlled $N_2$ atmosphere at room temperature. The fabrication procedure is given below.

A 130-nm-thick layer of poly(enthylendioxythiophene): poly (styrene sulfonic acid) (PEDOT:PSS, Bayer Batron 4083) was spin-cast (at 2000 rpm) onto pre-cleaned ITO-glass substrates. Next, a light emitting polymer (PFO-P0 or PFO-PC) was spin-cast at room temperature under ambient conditions from a toluene/THF solution to form a thin film about 80 nm. The solvent was thoroughly removed by subsequently baking the samples on a hot plate. The Ba cathode (50 nm thick) was then deposited through a shadow mask at a chamber base pressure of $<10^{-6}$ Torr. Finally, a 100 nm-thick Al capping layer was deposited onto the Ba layer. Thickness of the layers were determined using a crystal thickness monitor and a Dektak IIA profilometer for the evaporated and spin-cast films, respectively. Current density (j) -voltage (V)- luminance (L) measurements were obtained using a Keithley 236 source measurement unit and a calibrated silicon photodiode (computer interfaced with Lab View™ supplied by National Instruments). Electroluminescence (EL) spectra were recorded with a single-grating monochromator equipped with a photometric charge coupled device (CCD) camera as detector.

Figure 4:
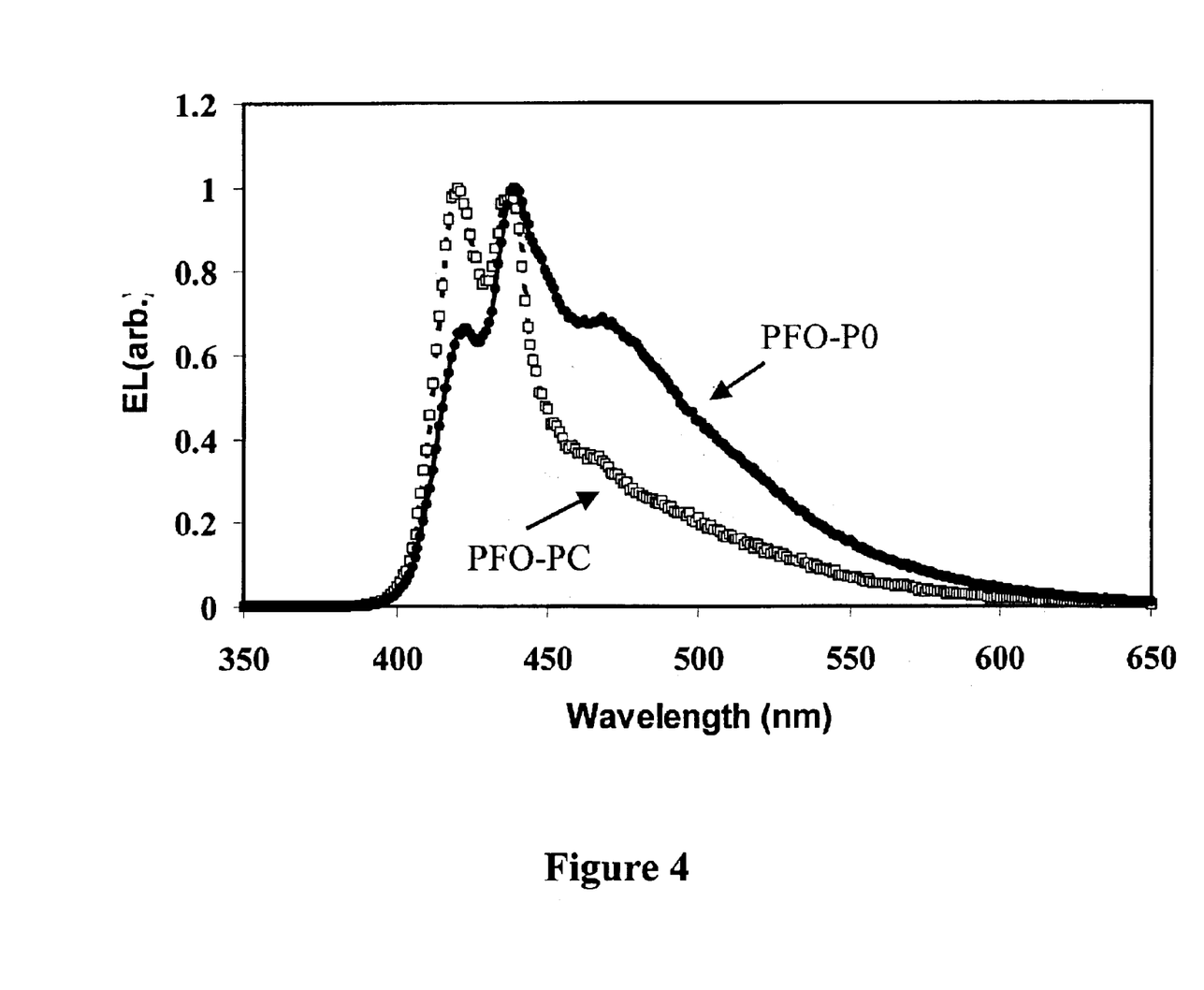
FIG. 4 EL spectra of polymer light emitting diodes fabricated with selected polyfluorenes.
Figure 5:
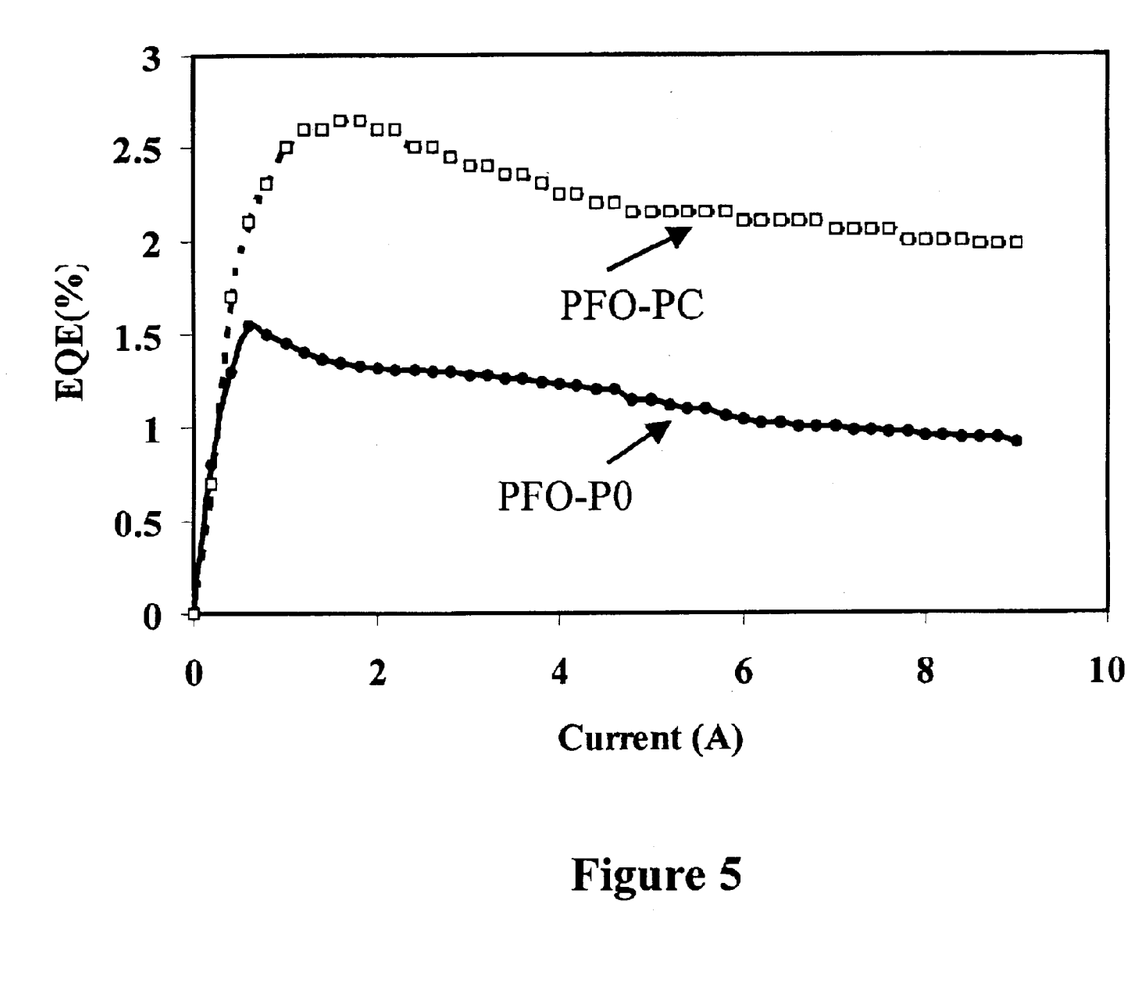
FIG. 5 External quantum efficiency at different currency for polymer light emitting diodes fabricated with selected polyfluorenes.

FIG. 4 depicts electroluminesence spectra(EL) of PLED made from polymer PFO-P0 and PFO-PC. FIG. 5 demonstrates the external quantum efficiency (EQE) of these devices. It is clearly seen that polymer PFO-PC that was purified according to the present invention exhibits both higher color purity and higher device efficiency than the parent polymer PFO-P0.

What is claimed is:

1. A method for the removal of metallic impurities from a conducting polymer for enhancing the performance of an opto-electronic device fabricated from said conducting polymer comprising the steps of:

dissolving said conducting polymer in a solvent, adding a scavenger in said solvent containing said conducting polymer, mixing said scavenger in said solvent with said conducting polymer to allow for reaction between said scavenger and said metallic impurities to form a compound, converting said compound into a phase different from said conducting polymer containing phase, and separating said compound containing phase formed from said metallic impurities from said conducting polymer containing phase.

2. A method for the removal of metallic impurities from a conducting polymer for enhancing the performance of an opto-electronic device fabricated from said conducting polymer as defined in claim 1, further comprising a step of promoting a chemical reaction between said scavenger and said metallic impurities to form a phase different from said conducting polymer.

3. A method for the removal of metallic impurities from a conducting polymer for enhancing the performance of an opto-electronic device fabricated from said conducting polymer as defined in claim 1, further comprising a step of heating said solvent with said conducting polymer and said metallic impurities to enhance reaction between said scavenger and said metallic impurities.

4. A method for the removal of metallic impurities from a conducting polymer for enhancing the performance of an onto-electronic device fabricated from said conducting polymer as defined in claim 1, wherein said conducting polymer is selected from a group of polyarylenes, polyarylenevinylenes, polyaryleneethylnylene, polyfluorenes, polyanilines, polythiophenes, polypyrroles, and their derivatives or co-polymers.

5. A method for the removal of metallic impurities from a conducting polymer for enhancing the performance of an onto-electronic device fabricated from said conducting polymer as defined in claim 1, wherein said scavenger is in a free standing form.

6. A method for the removal of metallic impurities from a conducting, polymer for enhancing the performance of an opto-electronic device fabricated from said conducting polymer as defined in claim 1, wherein said scavenger is carried by organic media.

7. A method for the removal of metallic impurities from a conducting polymer for enhancing the performance of an opto-electronic device fabricated from said conducting polymer as defined in claim 1, wherein said scavenger is carried by inorganic media.

8. A method for the removal of metallic impurities from a conducting polymer for enhancing the performance of an opto-electronic device fabricated from said conducting polymer as defined in claim 1, wherein said scavenger contains functional groups selected from cyano, amino, diamino, triamino, and thiol.

9. A method for the removal of metallic impurities from a conducting polymer for enhancing the performance of an onto-electronic device fabricated from said conducting polymer as defined in claim 1, wherein separating of said scavenger containing said metallic impurities from said conducting polymer is achieved by phase separation.

10. A method for the removal of metallic impurities from a conducting polymer for enhancing the performance of an opto-electronic device fabricated from said conducting polymer as defined in claim 1, wherein separating of said scavenger containing said metallic impurities from said conducting polymer is achieved by filtration.

11. A method for the removal of metallic impurities from a conducting polymer for enhancing the performance of an opto-electronic device fabricated from said conducting polymer as defined in claim 1, wherein separating of said scavenger containing said metallic impurities from said conducting polymer is achieved by centrifugal force.

* * * * *